UNITED STATES PATENT OFFICE.

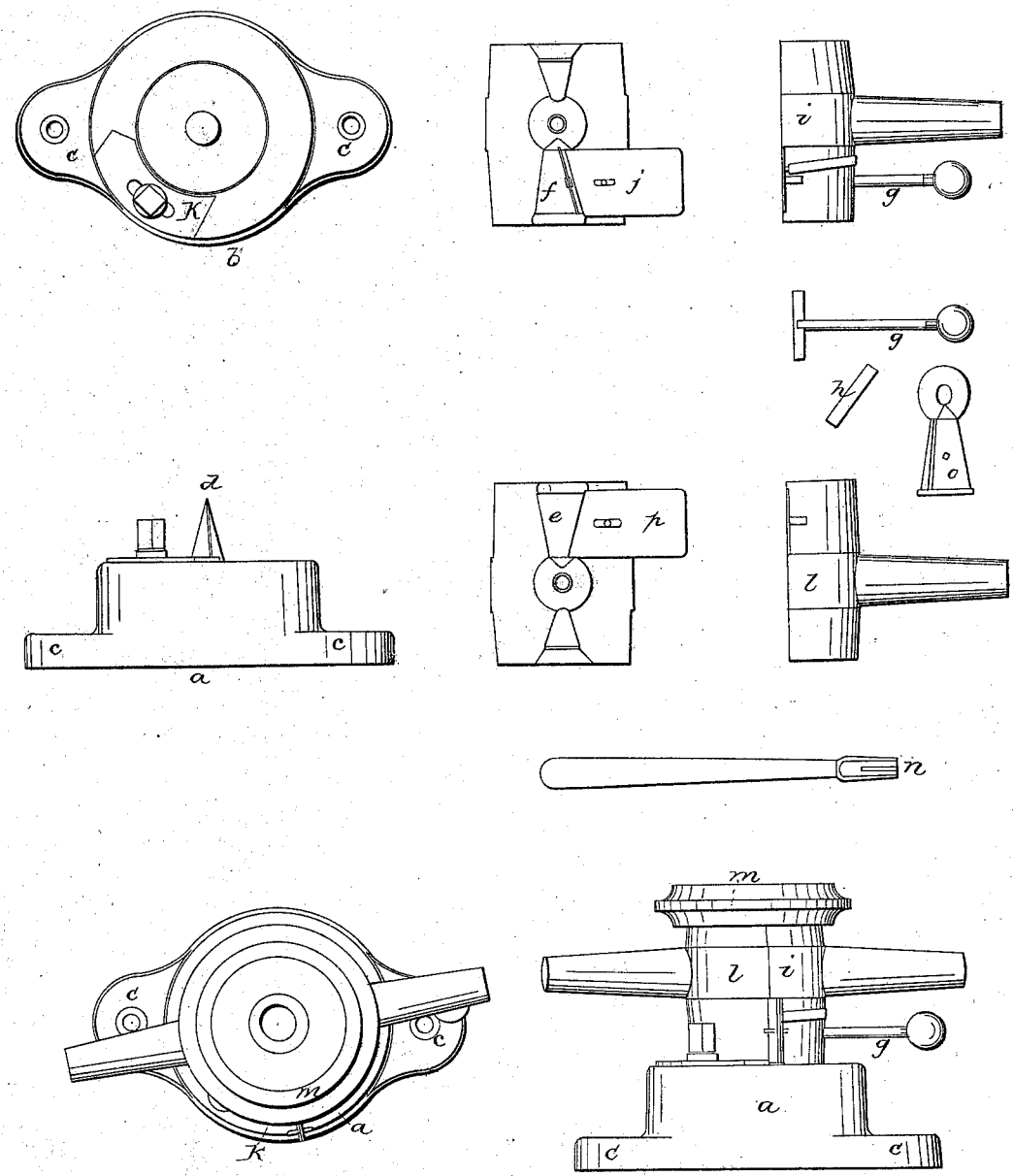

WALTER K. FOSTER, OF BANGOR, MAINE.

IMPROVEMENT IN MOLDS FOR CASTING PENCIL-SHARPENERS.

Specification forming part of Letters Patent No. 12,722, dated April 17, 1855.

*To all whom it may concern:*

Be it known that I, WALTER K. FOSTER, of Bangor, in the county of Penobscot and State of Maine, have invented a mode of securing a cutter in metal, by which an instrument is made for sharpening lead-pencils, and also an instrument for sharpening watch-cleaning sticks for the use of watch-makers.

The nature of my invention consists in providing, by the combination of the parts as herein set forth, for holding the cutting-blade in such a manner within the mold as to secure it there by the metal composition when poured into the mold, and at the same time make an article for sharpening lead-pencils.

To enable others skilled in the art to make and use my invention, I will proceed to describe its construction and operation.

I construct my mold in any of the known forms, or that seen in the annexed drawing, marked "elevation" and "plan." The elevation of the base of the mold is seen at letter A. The plan of the base is seen at letter B. The projections of the base of the mold, as seen at letters C C, are for the purpose of enabling me to secure it firmly by screws to the work-bench. The conical core of the mold is seen at letter D. The shape of the pencil-cutter is seen at E and F. A small spring-holder is inserted through an opening in the side of the mold for the purpose of holding in place a blade or cutter, as seen at letter G. A blade or cutter separated is seen at H. The side of the mold, letter I, is furnished with a flat sliding core, as seen at J. This side of the mold is taken into the left hand, and the spring-holder is then pushed in sufficiently to allow the cutter or blade to be inserted in its end.

To insert the cutter, hold it an angle of about eighty degrees and slip the cutting-edge between the springs of the holder until the thick part of the cutter has pressed open the holder. Then the cutter is brought down at right angles and held by the holder near its center. The holder is then drawn back until the flat sliding core J will come against the side of the cutter, so as to stop the metal composition from coming to the bevel edge or back of the cutter, and at the same time hold the edge of the cutter to its place in the groove of the conical core D, the object of this groove being to drop the edge of the cutter to make it take the wood in cutting.

In order to be certain that the cutter is in its exact place, I bring the face side of the left-hand mold down to a smooth level surface and push gently upon the ball of the holder. I then place the left-hand mold upon the base, with the sliding core at a sufficient distance from the gage, letter K, to admit the flat core of the right-hand part of the mold, letter L, to come between it and the gage. This gage, letter K, is for the purpose of varying the depth to which the edge of the knife or cutter shall be placed in the groove of the core D in order to make a thinner or a thicker shaving. The mold-piece (marked L) is placed on the back with the sliding core P touching the gage. This core is for the purpose of shutting off the composition from the front edge of the cutter in order to form a throat for the passage of shavings. The ring m is placed on the mold and the composition is poured in.

To open the mold I draw the two sliding flat cores by means of a small detached lever, letter N, lift off the ring, letter M, slip a stick into the opening at the bottom of the pencil-cutter, and disengage it from the end of the spring-holder. The pencil-cutter thus formed may be seen at O.

What I claim as of my invention, and desire to secure by Letters Patent, is—

The arrangement of the spring-holder $g$, sliding plates $j$ and $p$ in relation to the grooved core $d$, and the gage K, for the purpose of adjusting and holding of the blade $h$ in the mold, and the forming of the slot in the pencil-sharpener, as herein set forth.

WALTER K. FOSTER.

Witnesses:
JACOB A. SMITH,
JOHN S. SAYWARD.